United States Patent [19]

Carper

[11] Patent Number: 4,483,090
[45] Date of Patent: Nov. 20, 1984

[54] GENERAL PURPOSE BREAKAWAY TWO MAN HUNTING BLIND

[76] Inventor: Jackie D. Carper, 320 N. Georgia Ave., Pooler, Ga. 31322

[21] Appl. No.: 437,498

[22] Filed: Mar. 1, 1983

[51] Int. Cl.³ ............................................. A01M 31/00
[52] U.S. Cl. ......................................................... 43/1
[58] Field of Search .................... 43/1; 297/184; 52/69

[56] References Cited

U.S. PATENT DOCUMENTS

| | | | |
|---|---|---|---|
| 3,609,905 | 10/1971 | Fuhrman | 43/1 |
| 3,622,201 | 11/1971 | Radig | 43/1 |
| 3,902,264 | 9/1975 | Radig | 43/1 |
| 3,936,969 | 2/1976 | Richard | 43/1 |
| 4,164,089 | 8/1979 | George | 43/1 |

Primary Examiner—Gene P. Crosby

[57] ABSTRACT

The general purpose breakaway hunting blind provides two hunters with concellment and observation of game by camofloged screens and camofloged material surrounding them. The shooter can pull a lanyard release ring down. This causes each side of the blind to fall completely to the floor in less than one second. The shooters have a complete view everywhere except at the over drop of the boat or vegetation if the blind is placed on land. This blind is completely self supporting and needs to only be placed on the ground or placed on the Jon Boat gunwales and tied down to the boat frames where necessary.

2 Claims, 8 Drawing Figures

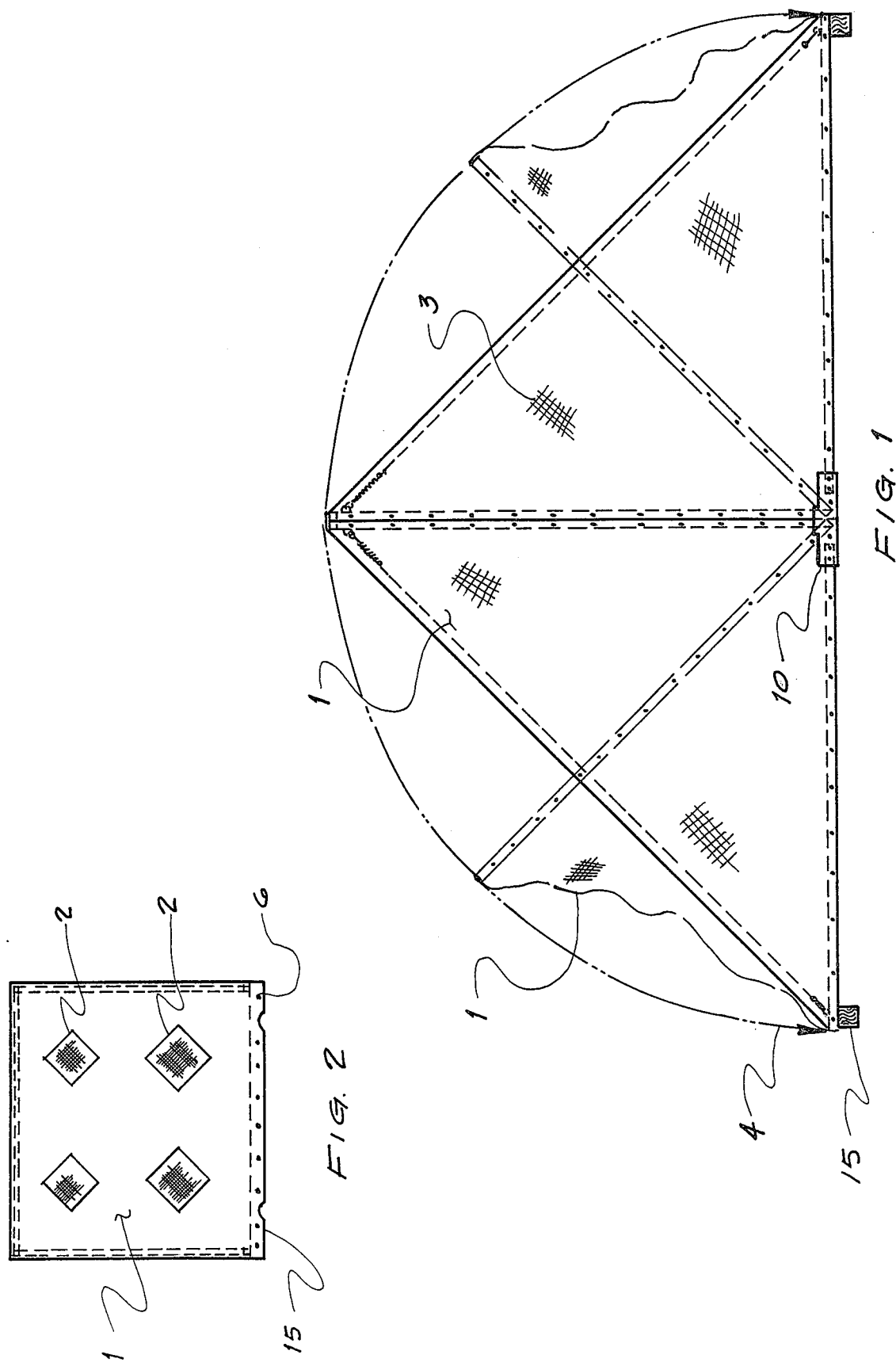

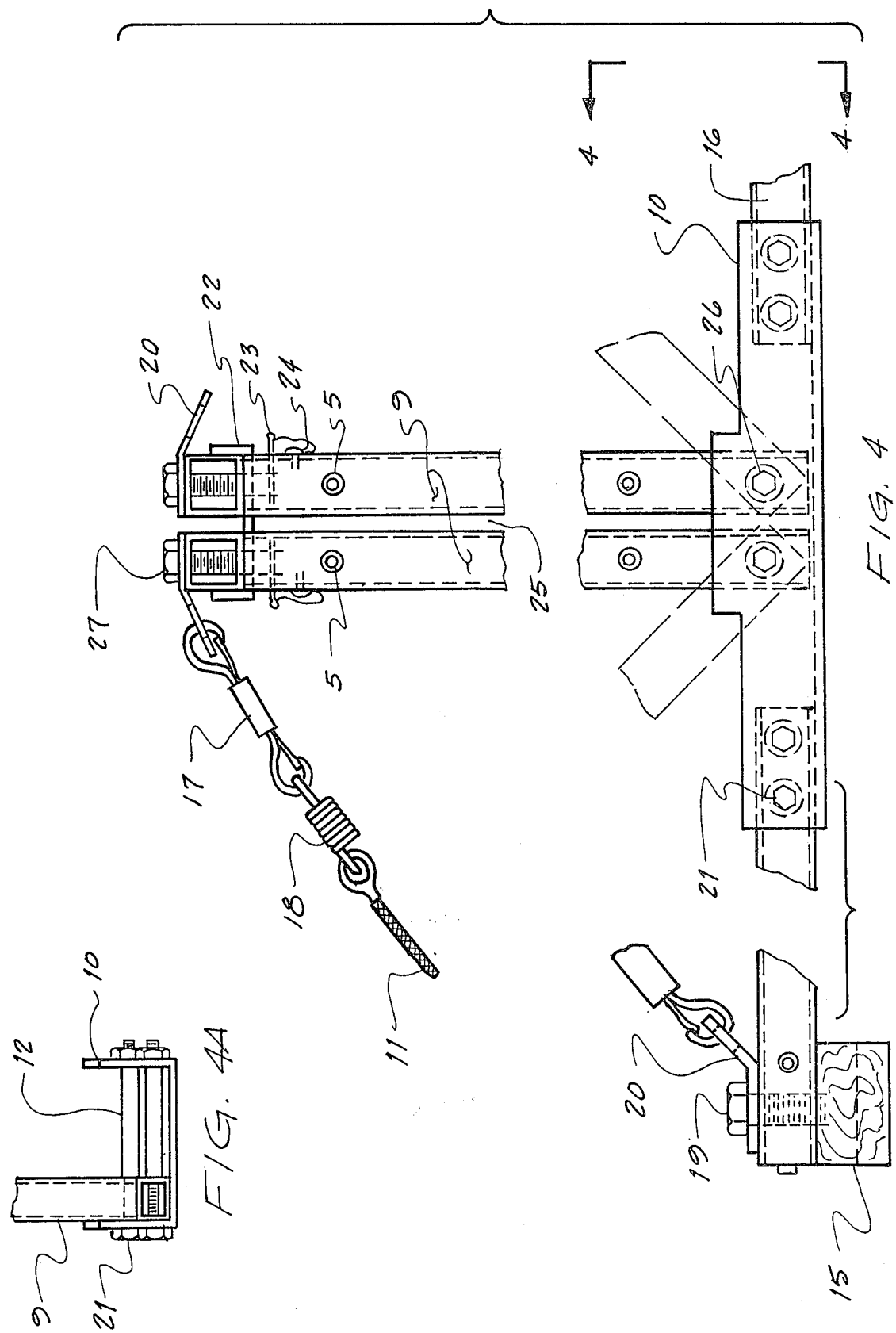

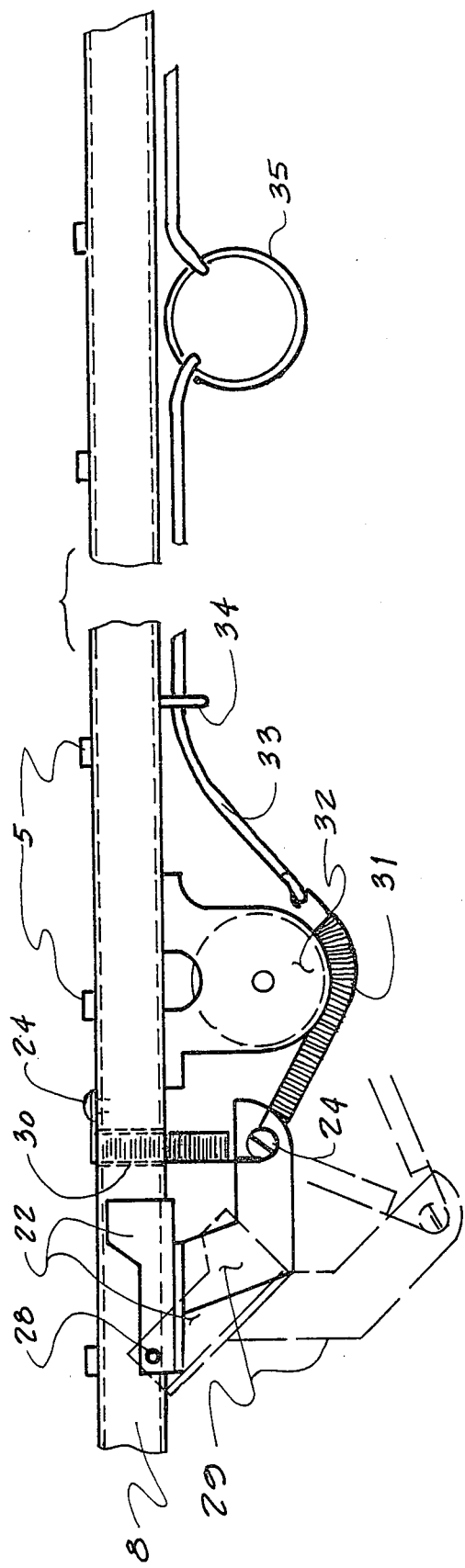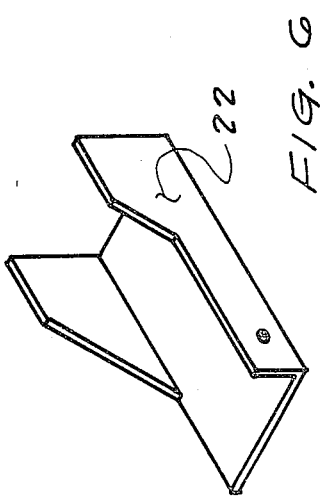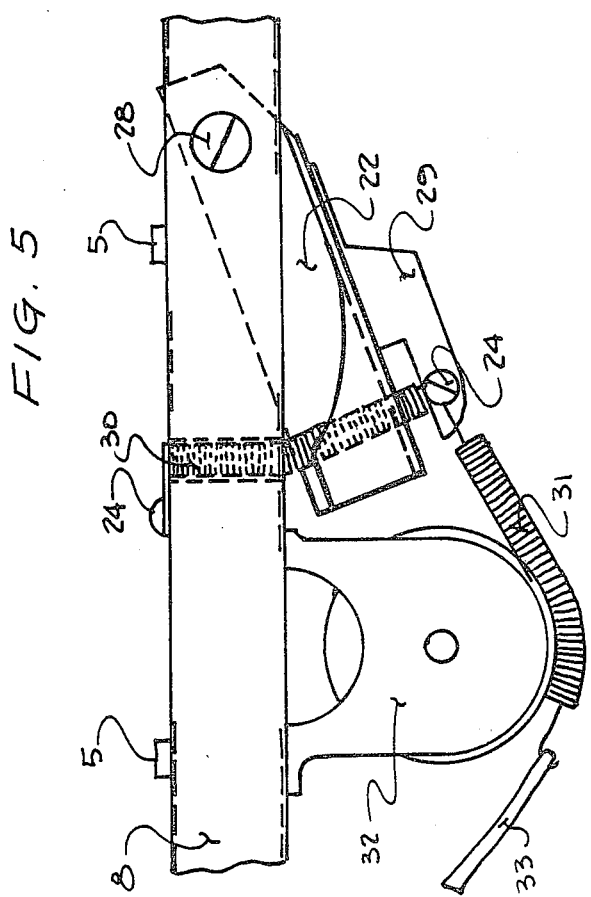

GENERAL PURPOSE BREAKAWAY TWO MAN HUNTING BLIND

Blind is a general purpose hunting blind. It has a frontal observation and shooting side and also the same rear observation and shooting side. The blind has two identical halves in construction. One frontal half and one rearward half. The frontal half blind contains the latching locking and releasing parts to make the blind complete. The complete fixed base bottom is secured by bolts. All other parts are intended to complement a breakaway operation and complete fall back to the base of the blind. The blind is held in the up erected position by a breakaway double trap frame latching assembly. The breakaway and fall features give a hunter quick view and no obstruction from the blind except at the floor or base of the blind. Push away screens give another option of shooting from concealment. The blind is self supporting in the up latched and locked position and also in the complete fall position. The blind is easy handled, loaded transported or carried in the fallen or low profile position. The blind requires no disassembly or assembly from home to the shooting area. It is intended to be transported in a pickup tied down or on a boat secured. This low profile gives little wind resistance. When the hunters reach their intended shooting area then only tie downs of the frame are untied and the blind is then relatched upright for ready use. This blind is intended to be used on water with a boat or on land by itself. It replaces permanent built blinds and can be moved to new sites with swift ease.

In the drawings:

FIG. 1 shows a side view of the hunting blind in the latched and locked position. It also shows the blind in a fifty percent fallen position.

FIG. 2 shows a frontal view of the blind with fabric cover and four camouflaged obserbation shooting screens. Top of the screens are held in place by velcro strips, sold under the trademark "Velcro". Top half maybe pushed out and down for shooting. The rear half blind is identical to FIG. 2 except it has only three observation and shooting screens. One screen appears at the bottom center of the blind. This is to operate outboard motor through screen hole.

FIG. 4 shows a detailed side view of frames and assembly parts.

FIG. 4A shows center frame bar and outer base frame bar alignments inside of center frame base assembly.

FIG. 5 shows a detailed view of latching, releasing and locking parts that are installed on the front upper horizontal latching bar.

FIG. 5A shows the channel latching plate open with the latching paw clearing the horizontal latching bar and allowing blind halves to open and each side to fall.

FIG. 6 shows a view of channel latching plate.

DETAILED DESCRIPTION

Figure 3:
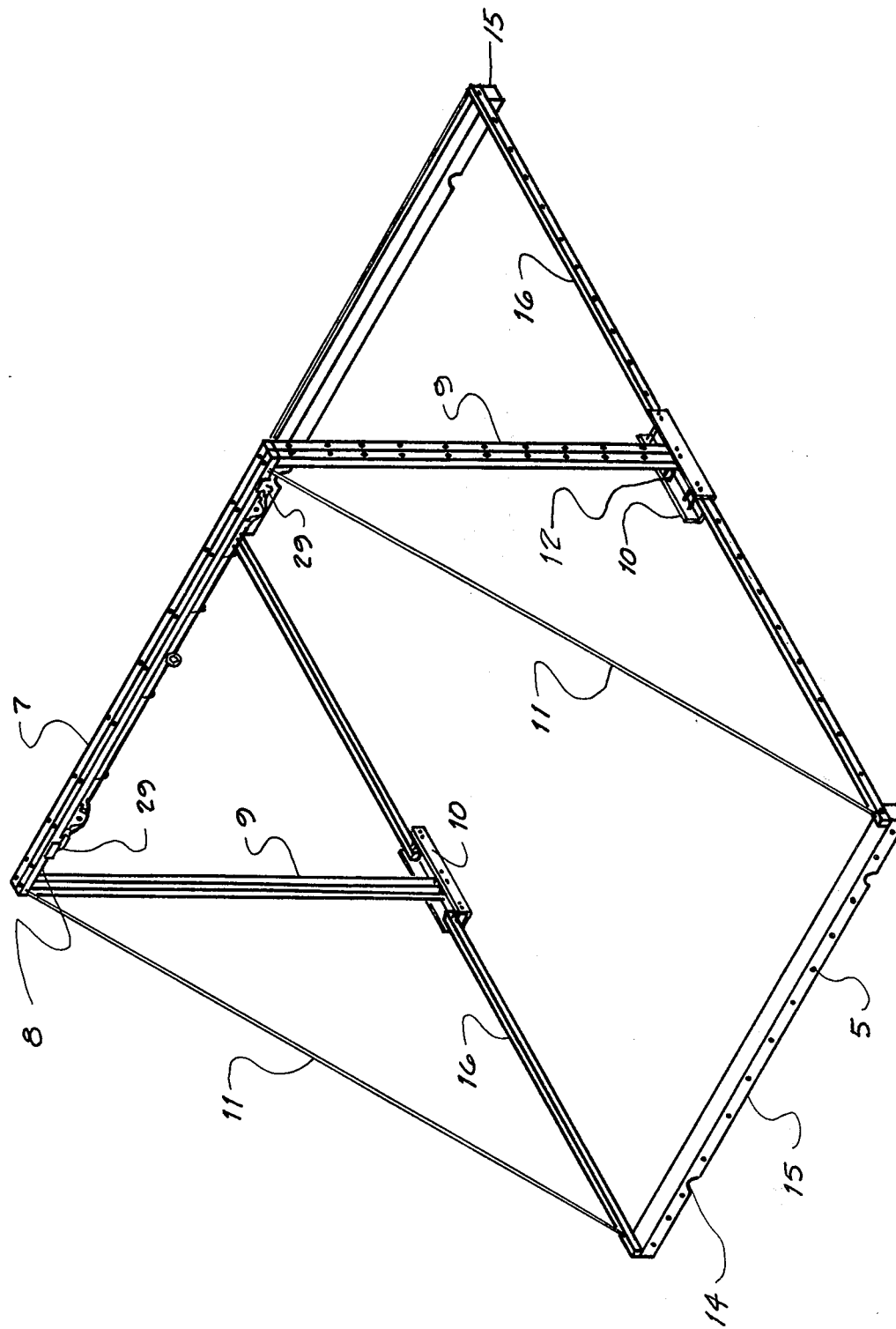
FIG. 3 shows a complete view of blind structure without blind covers or marine fabric.

This blind is an over the center double latching trap frame assembly (FIG. 2). In FIG. 3 horizontal latching bars 7 and 8 and center frame bars 9 are held upright and together by two channel latching plates 22. Channel latching plates are spring loaded closed. Four bungy cords 11 are attached to the lower four base frame bars 16 at the outer most frame corners. These bungy cords have approximately five pounds of down pull tension. The front side of the front horizontal latching bar 8 has ten pounds of pull and is opposed by the same ten pounds of pull from the rear bar 7. This placement holds the center frame upper assembly in place when locked (FIG. 3).

Two blind halves (FIG. 1) are snapped on the frames with snap fastners 6 at intervals of five to seven inches apart. Each blind half (FIG. 1) complements one side of the pull tension of the bungy cord 11. The bungy cord 11 makes the side frame of the blind for the material to rest on. The blind material 1 is made of light weight fabric which has a small stretch tension when snapped on to the breakaway half frame (FIG. 2). This adds approximately five more pounds of tension to one half side of the pull tension. When fully assembled and latched over the center, each blind half (FIG. 1) is opposing each side by approximately fifteen pounds of pull tension. When the blind halves (FIG. 1) are unlatched and the center frames 9 begins to fall apart in opposite directions the blind material 1 has no more stretch tension on opposing sides. Bungy cord tension and gravity complete the fall of equal blind halves 4. The blind fabric acts as if an umbrella was folding and places a small drag on each side of the frame for one half of a second. When the blind halves (FIG. 1) have fallen to the opposite base, it gives little or no profile. It appears to be two rectangular frame bars stacked on top of each other.

The frame material is aluminum ¾ inch square tubing ⅛ inch thick. The bottom cross mounts 15 are made of 2 inch by 2 inch wood, so that it may be adapted to different size Jon Boats and their gunwales. The frame outer cover 1 is lightweight marine fabric that provides protection against fire, weather and mildew with fifty pounds of tear strength or more.

This blind maybe used on any flat bottom boat with little sloping in gunwales and no construction work above gunwales. This blind should be tied down to the boat by rubber stretch straps with "S" hooks. These straps should be latched from the boat to blind with stretch tension. Drill ¼ inch holes where the rib frame remains away from outer skin of the boat. Drill holes in the 2 inch by 2 inch cross wood frame 15 and metal frame of the blind where needed to latch "S" hooks of rubber tie downs. This blind may be left on the boat and transported in the unlatched position 4 over the water or out to a stubble grain field, river bank island and water holes of game birds. The blind is light enough to be carried by one person to the game trails and placed for close concealment. Boat and blind may be left together and placed as one hunting blind in the field by use of boat trailer. The lower screen blinds 2 are used by the hunter when sitting on the boat seats. The upper screen blinds 2 are used by the hunter when placing blind on land. A fifteen inch swivel stool or sportsman swivel pail is to be used inside when the blind is on land. Swivel bass seats with a base stand of twenty four inches height may be secured approximately 60 inches forward of transom in order to use upper screen blinds 2 on the boat mounted blind. When it is too warm in the blind the sides of the blind may be unsnapped and rolled under the bungy cords 11. This is held in place by a general purpose clamp or the hunters may prefer half blind configuration being conceled from the frontal side. None of these changes in configuration affects the unlatching or falling of the blind except the blind missing side half falls slower. Outer rain cover may be placed over upright latched blind. It has marine fabric on the top and sides to cover the screens and center frame. It covers the leaking areas only in a shingle cover effect. This provides escape because the blind will not drop away in this configuration.

Observation side screens 3 are camouflaged and fixed in place. Camouflaged observation and shooting screens 2 have the upper half screens attached by velcro strips which allows the upper half to drop away by pushing out from the inside by the hunter. All screens are sewn with a strip band of marine fabric and then bands are sewn to outer marine cover. Marine snap fastener screw studs 5 are screwed onto frame like sheet metal screws to receive marine snap fastener buttons 6. Center frame base assembly 10 is a two inch wide, one inch high and approximately thirty inch long channel aluminum bar. The sides rise in the center one more inch to accomodate the operation and fall of the center frame bars 9. Center frame base assembly 10 is made wider than the frame bars for strength and non-distortion. Base bottom is also wider to rest weight on sandy or soft soil. The front side horizontal latching bar 8 contains all the latching, locking and blind release parts (FIG. 5). Bungy cord 11 is ⅜ inch in diameter. It is about fifty inches long and the length is adjusted to five pounds of tension at five inches of stretch. These cords make the outer edge and corners for the marine fabric cover halves. Side flaps of the cover pull down over the bungy cord 11 and snap on to the center frame bars 9 and base bars 16. Spacer tubes 12 are ½ inch in diameter and one inch long. They are slipped over the bolts and spaced between the bars and center frame base assembly 10. These tubes 12 are used to maintain frame bar alignments. The outer base corner connection 13 is shown at the bottom left side of FIG. 4. The cross base 15 is used to support the weight of the blind at the frontal side and the rearward side. Along with the center frame base assembly 10 it makes a base resting place. The cutouts 14 are made for the gunwales mounting positions on Jonh Boats.

Outer base frame bar 16 bends downward about two inches like the action of a bow and arrow when the weight of the blind is down on it and the blind is latched and locked. When the lock tension and the weight is removed this bar becomes straight again. Connector spacers 18 and snaps 17 are used to secure bungy cord 11 ends and space them for five pounds of tension when the blind frame is locked. Bolts of ¼ inch and 5/16 inch bolts 19–27 are used to secure frame assembly. Fourty-five degree angle plate brackets 20 are used under 5/16 inch bolt heads. Six bolts 21 and six lock nuts and six spacer tubes 12 are used in the bottom of FIG. 4. The channel latching plate 22 is held on to the front upper horizontal latching bar 8 by one side only. This one side is secured by a counter sunk ¼ inch bolt 28 protruding through the front upper horizontal latching bar 8 at the front side. The channel latching plate 22 falls with the front upper horizontal latching bar 8. It also latches both bars 7 and 8 together by paws which holds the sides of the channel latching bars 7 and 8 upright, parallel to each other and ¼ inch apart (FIG. 6).

The two channel latching plates 22 are operated open and spring loaded closed by all the parts mounted on bar 8. (FIG. 5). Return spring 30 and release spring 31 are used to make a smooth equal side release on each of the paws at the upper end of the channel latching plates 22. Return spring 30 keeps the plate 22 closed when no pull is placed on the lanyard pull ring 35. Angle bar 29 has a finger to connect springs 30 and 31. Angle bar is attached to the bottom of the channel latching plate 22 and its finger is placed to allow channel latching plates 22 to lower one inch each at the paw end. Down movement of ¾ of one inch on the paws causes a blind release and fall. The pulley 32 gives the correct pull angle and allows latching plate 22 to lower only one inch. Release cable 33 is held in place at all times by spring 30 and eyelet bolts 34. Lanyard pull ring 35 requires two inches of down pull at four pounds of pull with finger. This pull causes blind release and fall. Bolt holes are drilled at a height of 1½ inches on item number 26 to permit the center frame bars 9 to fall against the outer frame base bars 16 when blind is in the fallen position. A camel hump carter pin 23 is used to secure center frame bar top to upper frame horizontal latching bar. Pin is inserted through bar and then between two lock nuts spaced ⅛ inch apart on bolt 27. Pin protudes through opposite side hole. One corner of the locknuts six corners is removed to receive two 5/16 locknuts inside square tube of the center frame bar. Number eight panhead sheet metal screws are used in item 24. One quarter of an inch of space 25 exists between each frame half. This makes up the double latching trap frame assembly. Only the channel latching plate 22 crosses this space as shown in the top of FIG. 4.

This blind has been tested as follows for accidential release:

HIGH WIND (70 MPH) = No accidental release

Blind on side with John Boat attached. = No accidential release

Blind upside down and held on its upper horizontal latching bars 7 and 8. = No accidental release Screen door handles are put on both upper latching bars 7 and 8. They go behind 35 (FIG. 5). A three foot rope is tied to handles. This will permit one man to pull fallen blind halves back up for relatching blind halves. These items were omitted to prevent confusion on FIG. 3 and 5.

What I claim is:

1. A general purpose breakaway hunting blind, comprising, a rectangular base, said blind having two identical halves forming a frontal half and a rearward half, each of said halves being pivotally secured to the rectangular base about a separate transverse axis, each said axis lying parallel to the other and extending transversally of the base at a location substantially of equal distance from longitudinal ends of the base, respectively; resilient means oppositely biasing each of said halves to pivot about its respective axis to a breakaway position in which each half lies along the rectangular base; latching and releasing means secured to one of said halves, said latching and releasing means having locking means for holding said halves in a closed vertical position; actuating means for releasing said latching and releasing means, whereby the halves are moved by the resilient means to the breakaway position.

2. The general purpose hunting blind of claim 1, wherein each of the halves comprises a tubular frame, each said frame and said rectangular base having snap fasteners attached at spaced intervals for securing fabric between each tubular frame and a respective half of the rectangular base.

* * * * *